United States Patent [19]

Gammon et al.

[11] Patent Number: 5,156,567

[45] Date of Patent: Oct. 20, 1992

[54] GATHERING DEVICE FOR MEAT STUFFING MACHINE

[75] Inventors: David L. Gammon, Rochester; Michael J. Sullivan, Rochester Hills, both of Mich.

[73] Assignee: Brechteen Co., Mt. Clemens, Mich.

[21] Appl. No.: 538,575

[22] Filed: Jun. 15, 1990

[51] Int. Cl.⁵ .............................................. A22C 11/12
[52] U.S. Cl. ......................................... 452/48; 452/46
[58] Field of Search ..................... 452/48, 22, 30, 31, 452/32, 46

[56] References Cited

U.S. PATENT DOCUMENTS

| | | |
|---|---|---|
| 1,868,203 | 7/1932 | Henderson et al. . |
| 2,001,461 | 5/1935 | Hewitt . |
| 2,382,210 | 8/1945 | Cummins ............... 452/48 |
| 2,802,745 | 8/1957 | Bosel . |
| 2,983,949 | 5/1961 | Matecki . |
| 2,999,756 | 9/1961 | Shiner et al. . |
| 3,471,305 | 10/1969 | Marbach . |
| 3,553,768 | 1/1971 | Wilmsen . |
| 3,553,769 | 1/1971 | Myles et al. . |
| 3,621,513 | 11/1971 | Kupcikevicius . |
| 4,017,941 | 4/1977 | Raudys et al. . |
| 4,028,775 | 6/1977 | Tysver . |
| 4,034,441 | 7/1977 | Kupcikevicius et al. ........... 452/45 |
| 4,077,090 | 3/1978 | Frey et al. ........................... 452/38 |
| 4,133,076 | 1/1979 | Kupcikevicius .................... 452/45 |
| 4,164,057 | 8/1979 | Frey et al. ........................... 452/38 |
| 4,521,938 | 6/1985 | Kupcikevicius .................... 452/38 |
| 4,525,895 | 7/1985 | Raudys ............................... 452/39 |
| 4,541,660 | 9/1985 | Pujol .................................. 452/48 |
| 4,621,482 | 11/1986 | Crevasse et al. ................... 53/439 |
| 4,716,713 | 1/1988 | Crevasse et al ................... 53/530 |
| 4,719,116 | 1/1988 | Crevasse ........................... 426/315 |
| 4,766,645 | 8/1988 | Lamartino et al. ................. 452/31 |
| 4,910,034 | 3/1990 | Winkler ............................. 426/420 |
| 4,924,552 | 5/1990 | Sullivan ............................. 452/24 |
| 4,958,477 | 9/1990 | Winkler ............................ 53/138 R |

FOREIGN PATENT DOCUMENTS

| | | |
|---|---|---|
| 1014413 | 7/1977 | Canada . |
| 1123658 | 5/1982 | Canada . |
| 10937 | 5/1980 | European Pat. Off. ............. 452/8 |
| 1425767 | 2/1976 | United Kingdom . |

*Primary Examiner*—Willis Little
*Attorney, Agent, or Firm*—Harness, Dickey & Pierce

[57] ABSTRACT

A gathering device for a stuffed meat product. Pneumatically controlled noose means intermittently close as the meat product passes therethrough. This closure compresses the meat product and gathers the wrapping materials so that the operator need only twist the product to prepare it for the clipping process.

14 Claims, 5 Drawing Sheets

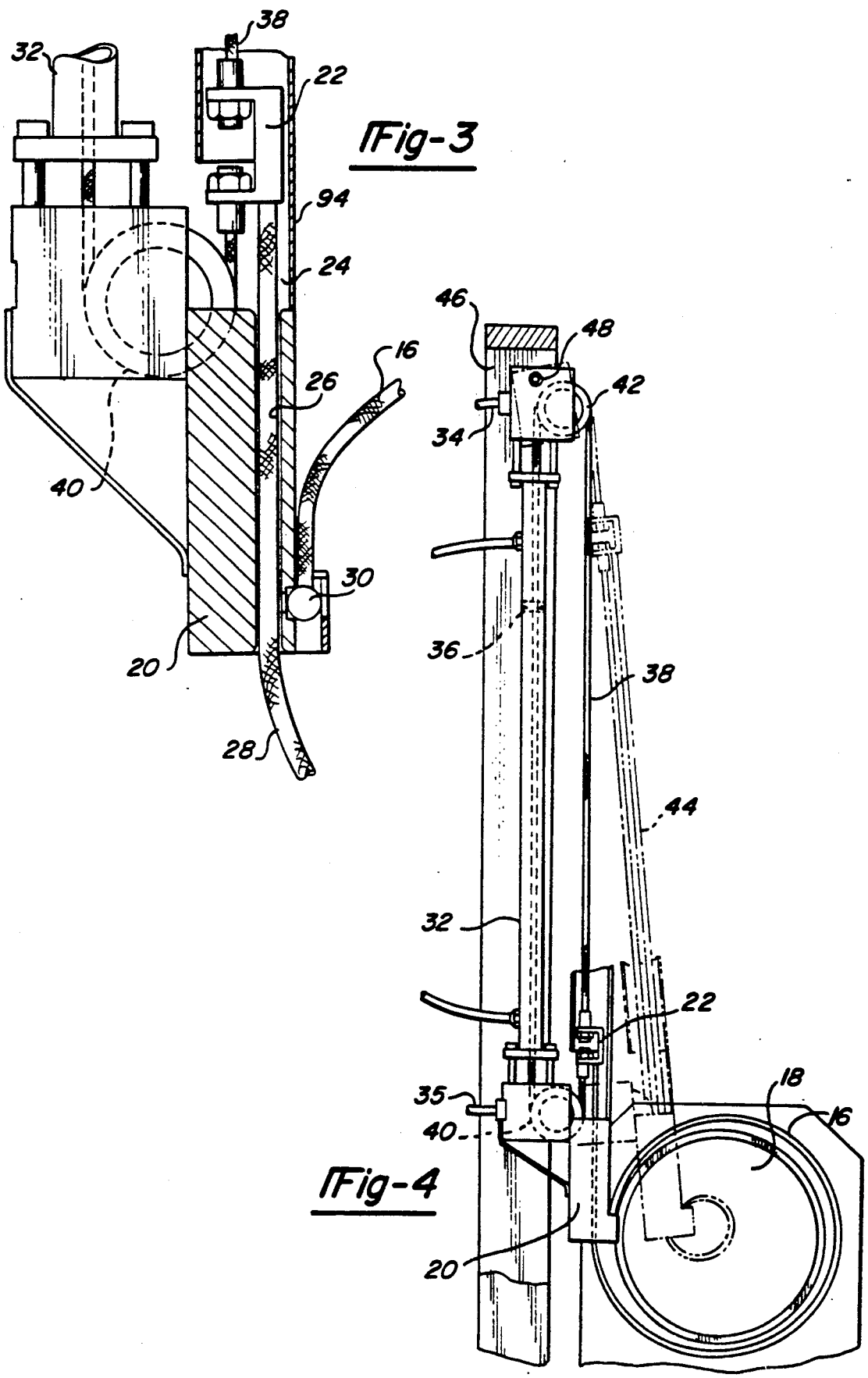

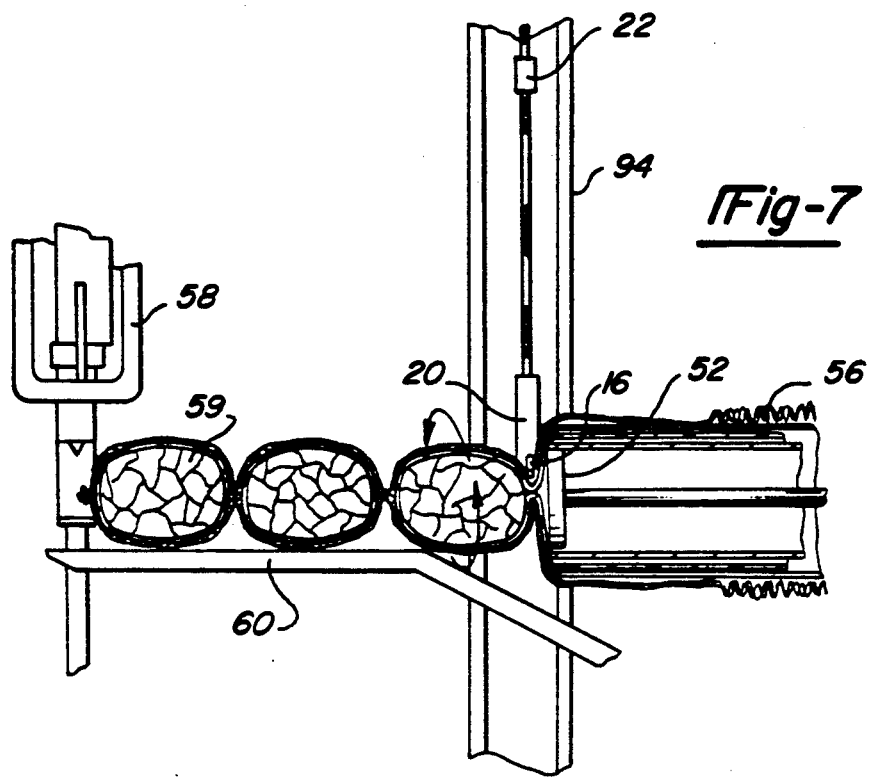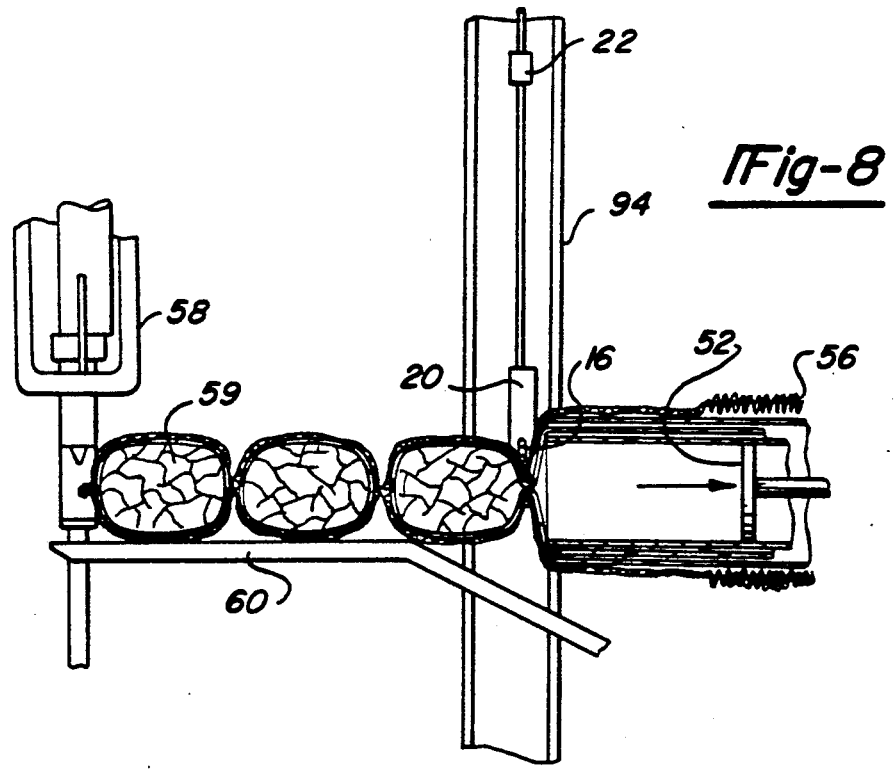

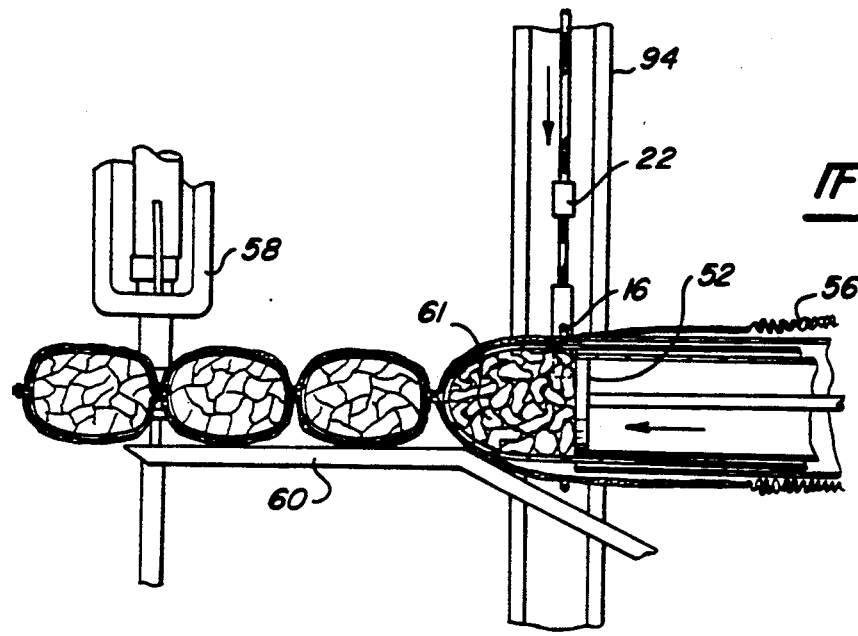
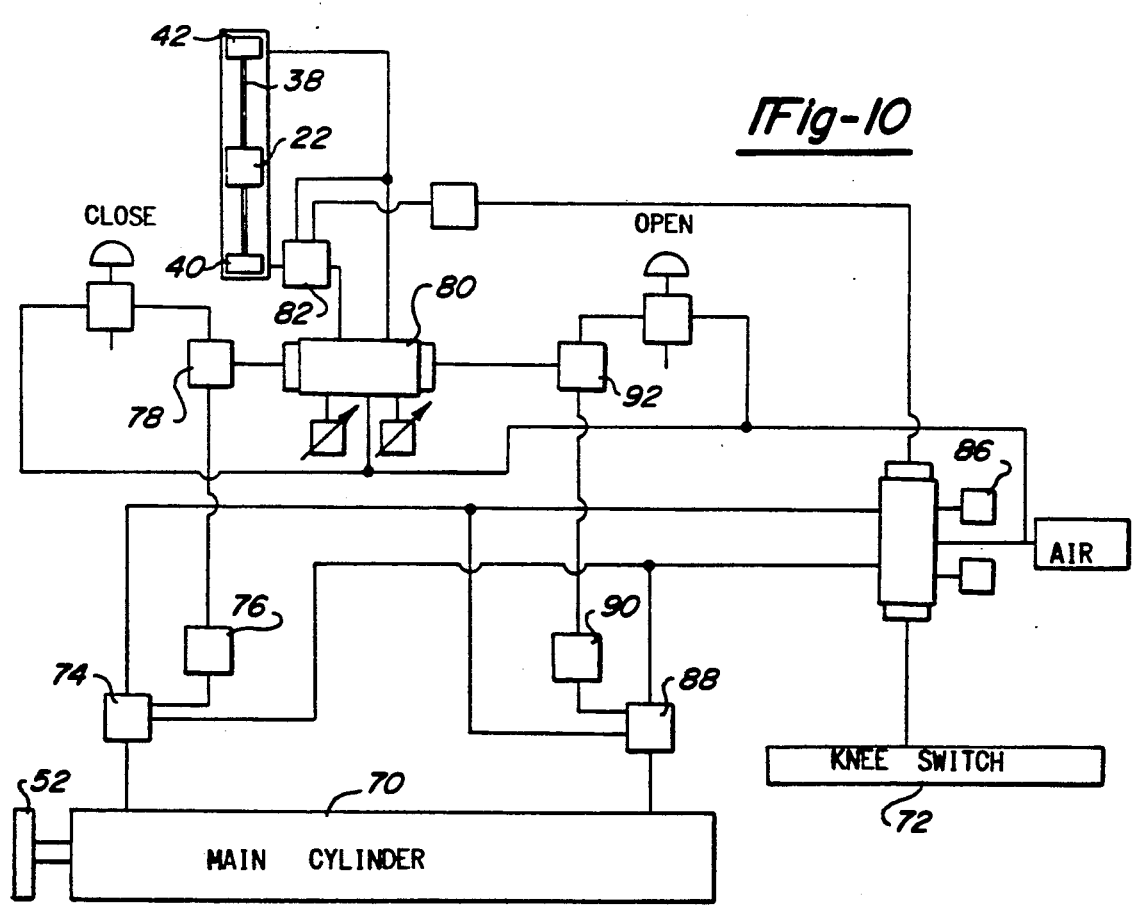

GATHERING DEVICE FOR MEAT STUFFING MACHINE

BACKGROUND OF THE INVENTION

1. Technical Field

This invention relates to food processing equipment and, more particularly, to a gathering device for use with a meat stuffing machine.

2. Discussion

In the meat processing industry sausage casings, films and/or netting are often used to contain or wrap stuffed meat products. For example, netting and an edible film are placed over an end of a stuffing horn and the meat products are forced into the netting/film through a chute in the horn by a ram. This technique is disclosed in U.S. Pat. No. 4,924,552 which is hereby incorporated by reference. Once the wrapped meat product exits the horn, typically the operator must grasp the meat product by hand and firmly squeeze it to form the ends. Immediately after compressing the meat product, the operator usually twist the product to bind the wrapping to prevent it from opening at the newly formed end. Finally, the formed product is carried to a clipping station that cuts and clips the wrapping material where it has been twisted to form individual meat products.

The present invention is primarily concerned with the way in which the wrapped meat product is compressed at one end after the ram has pushed the meat products into the opposite closed end of the wrapper. In the past, the operator of similar meat packing machines had to grab the meat product by hand and very quickly compress and twist the product before the stuffing ram retracted to prevent the meat from being sucked back into the horn. In order to allow sufficient time for the operator to conduct this compress and twist motion, the stuffing cycle had to be run at a relatively slow speed. Worse yet, because of the intricate bone structure of the human wrist joint, the operator may tend to develop ailments such as Carpal Tunnel Syndrome after conducting the compress and twist motion over an extended period of time.

One of the advantages of the present invention is the increased efficiency. By eliminating the need for an operator to simultaneously compress and twist the meat product the stuffing cycle may be run at a much quicker pace.

Another advantage of the present invention is a more uniformly shaped final product since the meat is no longer sucked back into the horn by the retracting ram.

A further advantage of the present invention over meat processing machines which use plates to compress the meat product ends is the safety afforded. If the operator's fingers happen to get caught in the gathering device of the present invention as it closes, it is much less likely that serious injury would result.

SUMMARY OF THE INVENTION

In accordance with the teaching of the present invention, once the meat product is stuffed into the wrapping, a noose closes over the meat product and wrapping to help close off the end of the wrapped meat product. This compression and gathering of the wrapped meat product occurs much faster and is much safer than was previously possible.

BRIEF DESCRIPTION OF THE DRAWINGS

The various advantages of the present invention will become apparent to those skilled in the art after having the benefit of reading the following specification and by reference to the drawings in which:

FIG. 3 is a side view partially in cross-section showing the traveller in its lowermost position, with the loop being fully open;

FIG. 4 is an end view which shows the arm (in phantom lines) pivoting to keep the loop essentially centered relative to the meat product as the loop is drawn closed;

FIG. 7 is a side view demonstrating how the meat product is twisted after gathering to prepare it for the clipping operation;

FIG. 8 is a side view which demonstrates the final step where the ram retracts and the loop is opened;

FIG. 9 is a side view which again shows the initial step in the gathering operation and also shows the final products being clipped; and FIG. 10 is a schematic illustration of the pneumatic control system.

DESCRIPTION OF THE PREFERRED EMBODIMENTS

Figure 1:
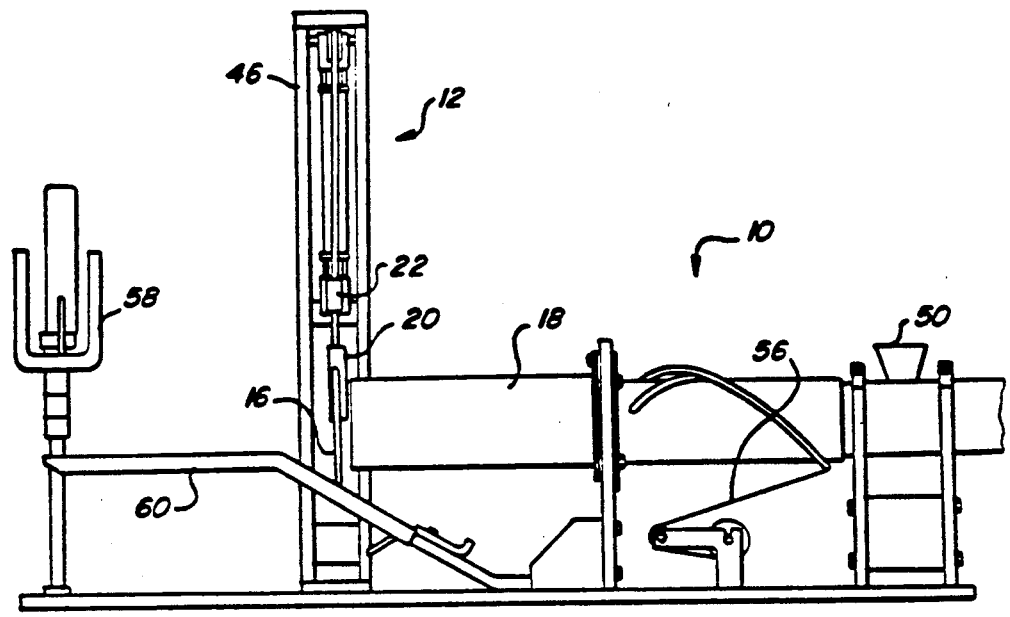
FIG. 1 is a side view of a meat stuffing machine made in accordance with the teachings of this invention, the gathering device being shown with the noose in a fully open position.

As eluded to earlier, the method and apparatus of the present invention are concerned with providing a gathering device which collects the meat product in wrapping to form individual wrapped and netted meat products such as hams and the like. FIG. 1 shows an example of the meat stuffing machine 10 which incorporates the gathering device 12 of the present invention.

Figure 2:
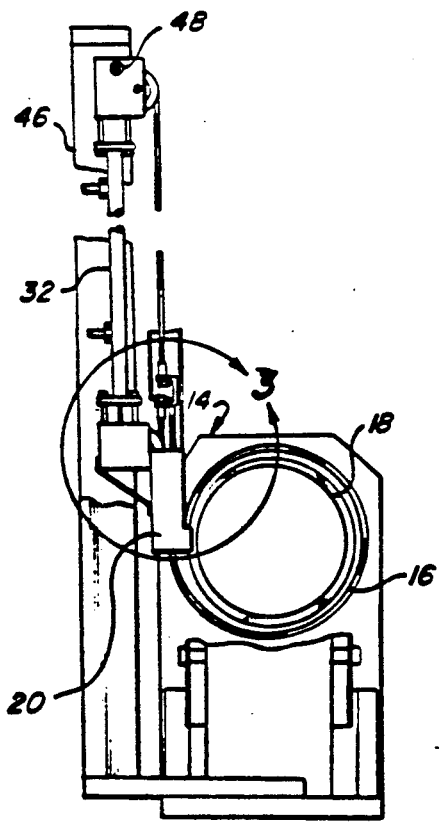
FIG. 2 is an end view of the gathering device showing the noose in a fully open position.

FIG. 2 is an end view of the gathering device with the noose mechanism 14 shown with the loop 16 in a fully open position. The loop is illustrated as a plastic coated cable; however, other flexible materials such as nylon ties could likewise be used. Initially the loop 16 has a slightly larger circumference than the chute or horn 18 to allow the extruded meat product to pass through the loop 16.

FIG. 3 is a close-up view partially in cross-section of the loop carrier member 20 and the traveller 22 to which a free end 24 of the loop cable 28 is coupled. The loop carrier member 20 is provided with a bore 26 through which portions of the cable comprising the loop pass as the system is activated driving the traveller 22 in an upward direction. An opposite end 30 of the loop cable 28 is fixed to the carrier member 20.

FIG. 4 is an end view which shows how the gathering device 12 operates to close the loop 16 about the wrapped meat product. When the meat stuffing cycle begins, the loop 16 is in a fully open position to allow the meat product to pass through. As the meat is forced out of the horn 18 the pneumatic system demonstrated in FIG. 10 is activated and the loop 16 begins to close. Closure of the loop occurs as air is injected into the cylinder 32 through port 34 driving piston 36 downwardly. This, in turn, causes the pulley cable 38 to rotate on the wheels 40 and 42. The pulley cable 38 is coupled to the traveller 22 which necessarily moves upward as the pulley cable rotates in a counter-clockwise direction. As mentioned, the free end 24 of the loop cable 16 is also coupled to the traveller 22. Therefore, as the pulley cable 38 rotates to draw the traveller 22 upward the loop 16 is closed about the meat product. FIG. 4 also demonstrates that as the loop 16 is drawn closed the entire arm 44 pivots about the fixed stanchion 46 at pivot point 48 to maintain the loop essentially centered relative to the meat product.

Figure 5:
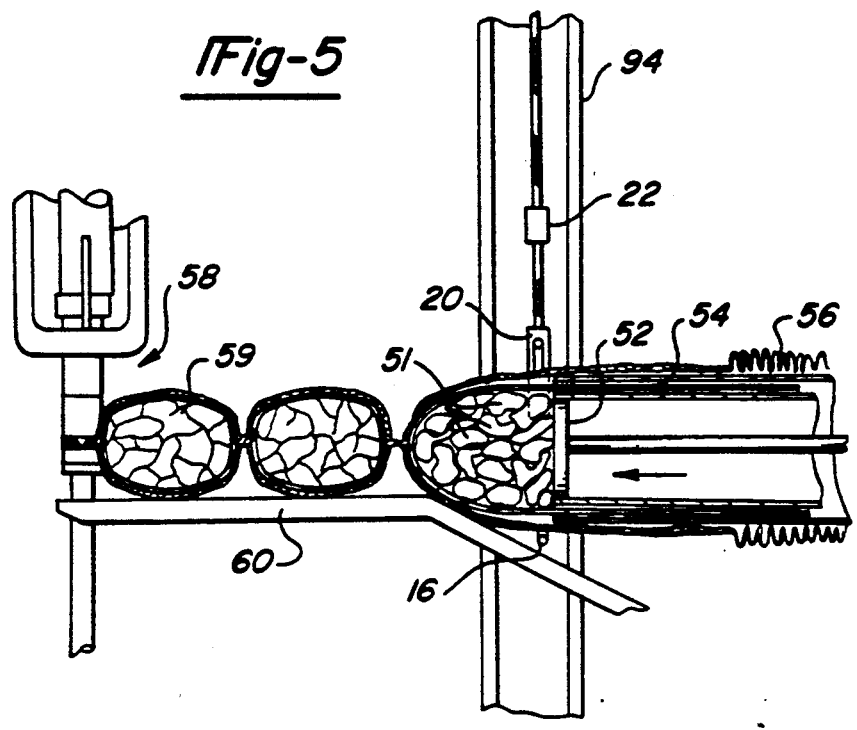
FIG. 5 is a side view of the gathering device during an initial step in the gathering operation.

Turning now to FIGS. 5-9, the operation of gathering the wrapped meat product is shown stepwise. In FIG. 5 pieces 51 of the meat product is introduced into the end (e.g., at inlet 50 shown in FIG. 1) of the stuffing horn 18 and is compacted by ram 52 within horn 18 and is stuffed into the wrapping material. As disclosed in U.S. Pat. No. 4,924,552, the wrapping material consists of an edible collagen film 54, such as COFFI film available from the Brechteen Co. and the an outer netting material 56 which covers the collagen-wrapped stuffed meat product. The loop 16 is shown in a fully open position ready to close about the stuffed product as the ram 52 reaches its forward end of its stroke. Farther along in the process the wrapped stuffed meat products which have been previously wrapped and gathered are carried to the clipping station 58. The clipper 58 is shown in FIG. 5 in an engaged position separating one end of the individual wrapped meat product.

Figure 6:
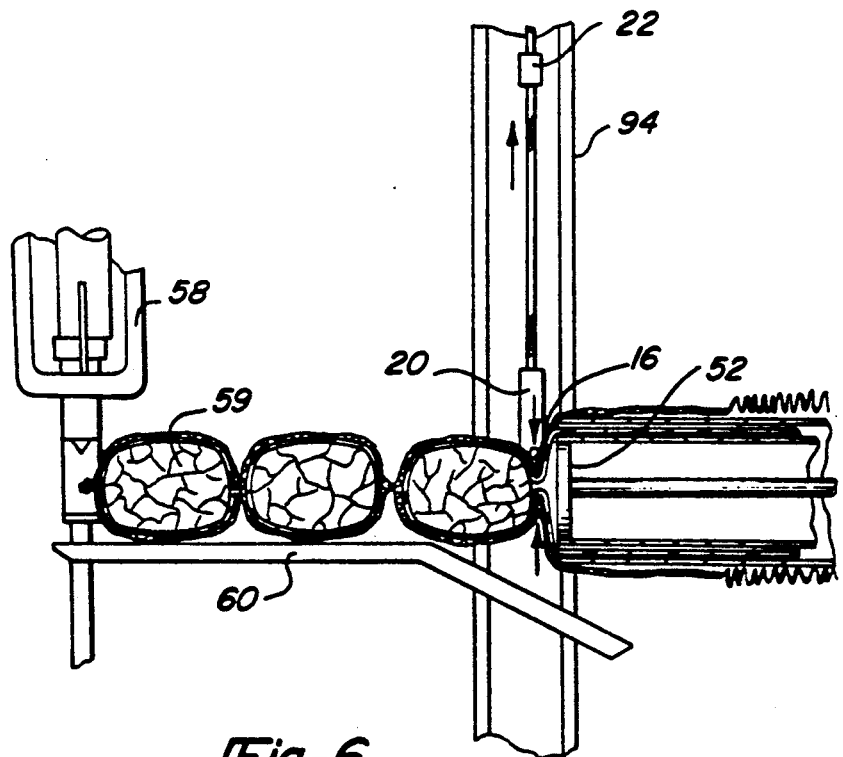
FIG. 6 is a side view showing the step of gathering the wrapped meat product and closing the loop about the product.

FIG. 6 shows the loop 16 being closed about the stuffed meat product as the ram 52 is in the very end of its stroke. The traveller 22 is moving in an upward direction which causes the loop 16 to close. The clipper 58 is shown in a retracted position to allow the meat product 59 to move along the platform 60.

FIG. 7 also shows the loop 16 in a fully closed position. At this point the wrapped stuffed meat product is twisted by the operator to close off the end in preparation for the clipping process.

In FIG. 8 the ram 52 retracts within the horn 18 beyond the inlet 50 where the meat product is introduced into the horn. When the ram fully retracts, the loop 16 opens in preparation for another cycle to begin.

Finally, FIG. 9 demonstrates the beginning of a new cycle where new meat pieces 61 are stuffed into netting-/film wrapping and, thereafter the loop 16 is drawn closed about the wrapped and stuffed meat product as discussed above.

FIG. 10 illustrates a pneumatic schematic diagram for stuffing machine 10. Main cylinder 70 is a pneumatically operated cylinder that moves ram 52 forwardly or to retract it depending upon which end of the cylinder compressed air is applied, in a manner known in the art. When the operator trips a simple switch such as a knee switch 72 on the machine, the cylinder 70 is operated so as to move ram 52 to the left or forwardly to push the meat pieces into the collagen film and netting. When the ram 52 reaches its end of the stroke, i.e., adjacent the end of the stuffing horn 18, sensor 74 senses the proximity of the ram 52 and causes an impulse relay 76 to send a signal to a shuttle valve 78. Shuttle valve 78, in turn, energizes 4-way valve 80 to cause the traveller 22 to move upwardly thereby carrying the free end of the loop 16 with it causing the loop 16 to contract or close about the wrapped and netted meat product. Then, the operator can twist the meat product which temporarily encloses the same. As noted before, one of the advantages of this invention is that it automatically performs the function of compressing the ends of the meat products together which was heretofore generally been accomplished manually. Another feature of this invention is that the pressure applied to valve 80 is such that the loop contracts with enough force to compress the meat products but without sufficient force to cause injury in the event that an operator's finger or other appendages accidentally became caught within the noose. Sensor 82 senses the end of the stroke of cylinder 32 (FIG. 4) which coincides with closure of noose 16 and sends a signal back to a valve 86. Valve 86 then shuttles to cause the main cylinder 70 to retract the ram 52 to its home position. When the ram 52 reaches its home position this is sensed by sensor 88 which, in turn, causes impulse relay 90 to send a signal to shuttle valve 92. Valve 92 causes valve 80 to energize cylinder 32 to move its piston 36 in an opposite direction thereby causing the traveller 22 to move downwardly thereby reopening the loop 16. The guide tube 94 that surrounds the cable 38 prevents it from buckling during this downward travel of the traveller 22. Now, the cycle is completed and ready for another meat stuffing operation.

Those skilled in the art will now come to appreciate some of the advantages of the present invention. The gathering device of the present invention allows the meat stuffing process to occur much faster by eliminating the need for an operator to gather the product by compressing each section as it comes out of the horn. The gathering device is also much safer than the previously known plate-type gathering apparatus. There is also greater uniformity of shape because the gathering device closes with the same amount of force each time and closes in a manner to prevent the meat product from being sucked back into the horn as the stuffing ram retracts. The skilled practitioner will realize still other advantages of the invention after having the benefit of studying the specification, drawings and the following claims.

What is claimed is:

1. A gathering device for a meat product which is stuffed into a wrapper from a stuffing horn, said gathering device comprising:
noose means located adjacent an end of the horn for selectively closing and opening a loop about the wrapped stuffed meat product, said loop being reusable for continuous selective opening and closing about the wrapped stuffed meat product as it moves through the loop such that upon opening the loop, after closing about the wrapped stuffed meat product, the wrapper stays in a crimped position to facilitate enclosure of the end of the meat product.

2. The gathering device of claim 1, which further comprises:
a stanchion mounted adjacent the end of the stuffing horn;
an arm having one end pivotally connected to the stanchion;
a loop carrier member having a bore therein and connected to an opposite end of the arm, a fixed end of the loop being coupled to the carrier member, with opposite end portions of the loop passing through the bore in the carrier member; and
motive means coupled to a free end of the loop for moving it substantially parallel to the arm to thereby control opening and closing of the loop, with said arm pivoting about the stanchion to maintain the loop essentially centered relative to the meat product.

3. The gathering device of claim 2, wherein said motive means comprises:
a pneumatically operated cylinder controlling reciprocating movement of a traveller, the free end of the loop being connected to the traveller.

4. The gathering device of claim 2, wherein said loop is formed from a plastic coated cable.

5. In a machine for simultaneously wrapping and stuffing meat products into a net, said apparatus including a stuffing horn having a free end, a tube with netting shirred thereon surrounding the end of the horn, means for feeding a wrapping material to the end of the horn inside of said netting, and a ram means for pushing meat products through the horn and simultaneously into the wrapping and netting, wherein the improvement comprises:
noose means located adjacent the end of the stuffing horn, said noose means providing a reusable loop surrounding the wrapped netted meat products;
means for closing the loop about the wrapped netted meat products when the ram reaches the end of its stroke adjacent the end of the stuffing horn, whereby an operator can twist the meat product to temporarily enclose the end thereof;
means for retracting the ram; and
means for reopening the loop when the ram has retracted such that the wrapper stays in a crimped position whereby the machine is ready for another meat product stuffing cycle.

6. The machine of claim 5, which further comprises:
a stanchion mounted adjacent the end of the stuffing horn;
an arm pivotally connected at one end to the stanchion;
a loop carrier member connected to an opposite end of the arm wherein a fixed end of the loop is coupled to said carrier member, with opposite end portions of the loop passing through the carrier member bore; and
motive means coupled to a free end of the loop moving it substantially parallel to the arm to thereby control the opening and closing of the loop, said arm pivoting about the stanchion to maintain the loop essentially centered to the meat product.

7. The machine of claim 6, wherein said motive means comprises:
a pneumatically operated cylinder controlling the reciprocating movement of a traveller wherein the free end of the loop is connected to the traveller.

8. The machine of claim 7, which further comprises guide tube means for preventing buckling of the loop as said noose means return to a fully open position.

9. The machine according to claim 5, wherein said loop is formed of a plastic coated cable.

10. A method for stuffing meat products into a wrapper, said method comprising:
using a ram to force meat products into a closed end of the wrapper which surrounds a stuffing horn;
closing a reusable loop around the wrapped food product;
retracting the ram; and
reopening the loop;
whereby reopening the loop facilitates the advancement of the stuffed meat product away from the stuffing horn.

11. The method of claim 10, which further comprises the step of:
twisting the meat product and
clipping the twisted end of the meat product.

12. The method of claim 10, wherein compressed air is reciprocally introduced into a pneumatically operated cylinder above and below a piston contained in said cylinder causing a traveller to open and close said loop.

13. The method claim 12, wherein a sensor senses the proximity of said ram as said ram nears the end of said stuffing horn, wherein said sensor causes an impulse relay to send a signal to a shuttle valve which energizes a second valve thereby causing compressed air to be introduced into said pneumatic cylinder above said piston simultaneously forcing said piston downwardly within said cylinder and said traveller upwardly thereby causing said loop to be drawn closed.

14. The method of claim 12 wherein a sensor senses the proximity of said ram as said ram retracts away from the end of said stuffing horn, wherein said sensor causes an impulse relay to send a signal to a shuttle valve which energizes a second valve thereby causing compressed air to be introduced into said pneumatic cylinder below said piston forcing it upwardly within said cylinder and said traveller downwardly thereby causing said loop to be opened.

* * * * *